United States Patent Office 3,515,684

Patented June 2, 1970

3,515,684

FLUIDIZABLE CATALYST PARTICLE FORMATION

James E. McEvoy, Springfield, Pa., assignor to Air Products and Chemicals, Inc., Philadelphia, Pa., a corporation of Delaware No Drawing. Continuation-in-part of application Ser. No. 492,883, Oct. 4, 1965. This application Feb. 17, 1969, Ser. No. 799,919

Int. Cl. B01j *11/40;* C01b *33/28*

U.S. Cl. 252—455 7 Claims

ABSTRACT OF THE DISCLOSURE

An impeller rotating in oil to provide a peripheral speed of from 3 to 30 meters per second provides an annular fringe zone of intense agitation. A dispersion of finely divided plastic particles in oil, said particles comprising kaolin and water, and said oil and plastic particles being at substantially the same temperature, is subjected to such intense agitation zone for at least a minute to agglomerate the particles to provide a size distribution suitable for fluidized cracking. The composition of the fluidizable particles withdrawn as product of the method is substantially the same as that of the smaller particles fed to the intense agitation zone. The thus agglomerated particles are precursors which may be transformed into fluidizable cracking catalyst particles comprising crystalline zeolite in a matrix of the kaolin type by any standard method.

CROSS REFERENCE

This is a continuation-in-part of Ser. No. 492,883 filed Oct. 4, 1965, and now abandoned.

BACKGROUND

This invention relates to the manufacture of particles of fluidizable cracking catalyst.

It is generally desirable for at least ⅘ of the weight of a supply of fluidizable cracking catalyst particles to consist of particles which are within a tenfold range of diameters (e.g. 15 microns to 150 microns) even if up to about 10% by weight of smallest particles and up to about 10% by weight of largest particles are outside such range. It is sometimes convenient to describe such fluidizable particles as having an average diameter of about 60 to 65 microns to distinguish fluidizable catalyst particles from granular particles having minimum dimensions of the magnitude of 2,000 to 13,000 microns (2–13 mm.). Diameter measurements of fluidizable particles are made by the technique requiring sifting through micro-screens or by other acceptable known methods.

The present invention is concerned primarily with the shaping and particle size control of precursor particles. Factors such as the proportions of ingredients or the like have pertinence to the manufacture of precursor particles scheduled to become fluidizable cracking catalyst particles but are less relevant to the present invention. Heretofore there have been descriptions of compositions comprising a clay carrier and reactive alkaline aluminosilicate components suitable for recrystallization into a precursor for cracking catalyst featuring the presence of large pore zeolite adapted to sorb benzene in the zeolitic pores. Such compositions for "in situ" recrystallization into precursors for cracking catalysts have generally been shaped into granular cracking catalyst particles. Any previous or future variations in such composition, while still achieving a cracking catalyst featuring such large pore zeolite sorbing benzene in the zeolitic pores, is embraced within the "zeolitic precursor composition" terminology.

SUMMARY

In accordance with the present invention, a zeolitic precursor composition is converted to a finely divided flour in a grinding apparatus such as a hammer mill. The flour is dispersed in oil and the oil dispersion in which the flour and oil are at substantially the same temperature. Said uniform temperature dispersion is subjected to the influence of intense turbulence at the fringe of swirling liquid. A mixer having a horizontal disc impeller rotating so that the tips of the vertical vanes extending from such disc have a peripheral speed within the range from about 3–30 meters/second (590–5900 feet/minute) can maintain the desired type of intense turbulence at the fringe of the liquid which is swirling under the influence of the impeller. As used herein, "intense turbulence" embraces the strong forces of the type created by vanes with peripheral speeds within the range from 3–30 meters/second, but is not restricted to the use of particular apparatus. Such intense turbulence treatment of the tiny, irregularly shaped, solid, quasi-plastic particles of such zeolitic precursor composition brings about both spheroidizing of such particles and an agglomeration of the particles to produce larger particles having substantially the same composition as the flour.

The duration of the intense turbulence treatment is restricted to prevent the formation of more than 10% by weight of particles larger than 150 microns by such agglomeration process, which duration is within the range from 1–60 minutes. If desired, the resulting dispersion of particles in oil may be subjected to size classification to eliminate a significant portion of both the particles smaller than about 15 microns and the particles larger than about 150 microns diameter. An important advantage of the combination of the grinding of the zeolitic precursor composition and treatment in the intense turbulence zone is that the resulting particle size distribution is so satisfactory that the entire product can be further processed without fractionation of the particle sizes in such dispersion. A mixture of the spheroidized particles and oil is advanced toward the aging and recrystallization steps of the catalyst manufacture.

DESCRIPTION OF PREFERRED EMBODIMENTS

The invention is further clarified by reference to a plurality of examples.

Because the preferred embodiment is concerned with fluidizable cracking catalyst derived from clay, it is appropriate to discuss some of the clay technology generally known to artisans accustomed to preparing experimental cracking catalysts. It has been customary to schedule for cracking catalyst end use only those clays containing on an anhydrous basis no more than about 0.4 weight percent iron as $Fe_2O_3$, and this precaution of the prior art technology can be implied into substantially any description of making cracking catalyst from clay without an iron removal step such as acid leaching. In mining clay, it is customary to remove gravel and debris at an early stage of processing. Because particular markets, such as paper sizing, require small (e.g. 0.001 to 1 micron) particle size kaolin, such materials sometimes can be removed profitably from raw clay prior to segregation of a catalytic grade of kaolin having particles of a diameter range such as 1 to 7 microns, many being about 3 microns.

Meta kaolin has been prepared by heating any grade of kaoline at conditions sufficient to remove most of the water of crystallization but so that the residual volatilizable matter is within a range from about 0.1% to about 1% by weight.

Mullite is a crystalline aluminosilicate produced by severe calcination of any of many aluminosilicates. The nominal composition of mullite is $3Al_2O_3 \cdot 2SiO_2$. "Partial mullitizing" is a generic term for severe calcination of aluminosilicates without regard to the presence or absence of mullite. The term "mullitized kaolin" designates herein a product prepared by calcining kaolin and/or meta kaolin at conditions sufficiently severe to reduce the content of water of crystallization to below 0.1%. In making a cracking catalyst, the "mullitized kaolin" and "meta kaolin" are each desirably derived from a cracking catalyst grade of kaolin.

Clays other than kaolin are also made more reactive to aqueous alkaline environments by thermal treatment causing dehydration to products comparable to meta kaolin and mullitized kaolin.

Example 1

In order to prepare a fluidizable cracking catalyst by a series of steps, an alkalized clay dough was prepared by mixing and mulling a composition prepared by adding 47 kg. of 4.7 normal NaOH solution to mixed clays consisting essentially of:

| | Kg. |
|---|---|
| Catalytic grade kaolin | 73.09 |
| Meta kaolin | 5.22 |
| Mullitized kaolin | 31.33 |
| Clays | 109.64 |
| $Na_2O$ in NaOH solution | 5.88 |
| $H_2O$ in NaOH solution | 41.12 |
| Alkalized clay dough | 156.64 |

The duration of the mulling and related operations was sufficient to permit the aqueous alkali to react with the mixture of clay type of components for about 30 minutes and such aging modified the characteristics of the composition. The plastic dough was vacuum extruded and sliced to form pellets having sufficient freedom from adhesiveness to be handled as a gravitating bed.

During the transfer of the freshly extruded clay pellets to grinding apparatus, the pellets were permitted to age for about 5 minutes, and such aging may have helped to promote the development of properties amenable to the pulverization step. Any of many types of grinding apparatus may be employed to pulverize the pellets into a flour, but good results have been observed in the use of preferred hammer mills. A laboratory Bantam Mikro-Pulveriser was used at two sets of conditions as follows:

| | Coarse | Fine |
|---|---|---|
| Hammer speed, r.p.m. | 12,000 | 16,000 |
| Pulley on motor, mm. | 178 | 178 |
| Pulley on mill, mm. | 51 | 32 |
| Screen, mm. opening | 1.2 | 0.66 |
| Feed screw rate, r.p.m. | 80 | 52 |
| Vents | Closed | Closed |

The flour produced at the coarse setting proved most satisfactory.

The flour was discharged into an inert organic liquid of the type conventionally employed in aging particles which are precursors to cracking catalyst particles. The particular liquid was a high flash point, heavily acid-treated white oil. A dispersion of the flour in oil was formed. The temperature of the flour was substantially the same as that of the oil. The uniform temperature dispersion was transferred to a high shear mixer normally adapted to achieve hydraulic attrition by impact of particles and rubbing together of particles in a zone of intense turbulence at the fringe of swirling liquid. Any of many types of high shear mixers may be used if the turbulence at the fringe of the swirling liquid is sufficiently intense. Spheroidizing of the quasi-plastic particles is best achieved by such intense turbulence, but even moderate turbulence can achieve some spheroidizing. One type of mixer providing the required intensity of turbulence is one in which vertical vanes have a peripheral speed of from about 3 to about 30 meters per second. An example of suitable apparatus is a Cowles Laboratory Model 1 VG having a capacity of about 7 liters and a 10 cm. impeller. The dispersion was subjected to intense turbulence with said Cowles impeller rotating at 4500 r.p.m. for six minutes. The circumferential speed of the vertical vanes (directed above and below the plane of the horizontal disc) was approximately 24 meters per second. The rotating impeller created the swirling liquid having intense turbulence.

The flour consisted predominantly of jagged, irregular particles the largest dimension for each particle being within a range of from about 1 to about 150 microns. The product from the six minutes of high shear agitation consisted predominantly of spheroidal particles having a diameter range from about 15 to about 150 microns, and thus can be designated as within the range suitable for use as fluidized cracking catalyst. Such larger particles had substantially the same chemical composition as the flour, the agglomeration of the plastic flour particles into fluidizable particles being essentially a uniform temperature bonding together of particles. Moreover, the transformation of particles from jagged to spheroidal shape is of extreme importance in enhancing the attrition resistance of the cracking catalyst and in minimizing the abrasive eroding characteristics. Erosion of walls of vessels and conduits occurs in fluidized catalyst systems and the spheroidized particles are preferred over jagged particles in minimizing erosion. Data relating to attrition resistance of the spheroidized particles are evaluated on the assumption that low erosion rates accompany low attrition losses.

Compositions comprising sodium hydroxide and meta kaolin can be aged and recrystallized to form sodium faujasite precursors for cracking catalysts while simultaneously increasing the strength of the particles. Conditions are controlled so that the particles, prior to ion-exchange, contain about 20% sodium faujasite. Most of the sodium faujasite is exchanged to form ammonium faujasite, which is converted to a product conveniently called hydrogen faujasite (without regard to the degree to which acid anhydride linkages or decationized sites are formed) by heating in a hot gas stream. The hydrogen faujasite must have a silica to alumina unit ratio greater than about 3.3 in order to achieve a commercially acceptable resistance to inactivation by the presence of relatively large amounts of high temperature process steam to be characterized as a steam-stable cracking catalyst. Precursors for such advantageous cracking catalysts are prepared by controlled aging of alkalized clay.

The dispersion of alkalized clay particles of fluidized size range was transferred to aging tanks and aged for about 24 hours at about 37° C. and about 24 hours at about 96° C. to obtain formation of sodium faujasite in the particles. The density of inert liquid and stirring thereof were controlled to minimize setting and/or agglomeration of the particles without excessive agitation of the particles. The aged particles were treated 14 times with about 1 molar solution of aqueous ammonium nitrate (density about 1.0317 g./ml. or about 7.7% by weight) at about 95° C. for about 2 hours for each treatment. The quantity of ammonium nitrate used per treatment corresponds to about one-half the stoichiometric requirements for the quantity of sodium faujasite ($Na_2O \cdot Al_2O_3 \cdot 4.4SiO_2$) expected in the particles. The quantity of sodium faujasite in the precursor just prior to exchange with the ammonium salt was measured by X-ray diffraction and found to be about 22% on an anhydrous basis. Factory experience has favored the convenience of using ammonium nitrate solution even for the first aqueous treatment of the aged pellets even though the particles contain excess sodium hydroxide which can be removed by water washing. The total quantity of ammonium nitrate employed was 700% of the stoichiometric requirement (600% excess) for the conversion of the sodium faujasite to ammonium faujasite, but the ion-exchange was not exhaustive. It is convenient to consider the approximately 22% faujasite content of the precursor at this stage as about 75% ammonium faujasite and about 25% sodium faujasite. The residual alkali in the exchanged particles comprising 22% faujasite (75% ammonium, and 25% sodium) was 0.8% $Na_2O$ on an anhydrous basis. Terminology such as ammonium faujasite is appropriate notwithstanding the presence of such residual alkali. Exhaustive ion-exchange can further reduce the sodium content, but cracking catalysts containing about 0.8% sodium can be manufactured more conveniently than faujasite type cracking catalysts with less residual sodium.

The particles comprising ammonium faujasite were dried at 121° C. for 4 hours and then transferred to a container suitable for the subsequent heat treatment. The container with included dry particles was placed in a preheated furnace and the temperature of the contents was raised to 810° C. in the presence of flowing steam. The nominal heat treatment thereafter was at 810° C. for 4 hours in a flowing 100% steam atmosphere. The container was removed from the furnace and allowed to cool to room temperature. The initial stage of such heat treatment can be deemed a further drying step followed by a deammoniation step followed by a dehydration step and then the stabilization step. There is much overlapping of the conceivable reactions during the heat treatment, all reactions occurring simultaneously at rates which vary. The cooled particles of such fluidizable cracking catalyst had high surface area, and tended to sorb moisture from the air. Substantially all of the product particles were of a size passing through a sieve designated as 100 mesh, U.S. Standard Sieve with less than 4% by weight of particles smaller than 20 microns in diameter. Variables affecting the method cause some variation in size distribution, but usually less than 20% by weight, of particles retained by 100 mesh or passing through 20 micron sieves, and/or outside the 15–150 micron diameter range.

Attrition tests on said fluidizable catalyst demonstrated that its resistance to attrition was superior to a commercially marketed fluidizable cracking catalyst. An air jet attrition test was conducted on the cracking catalyst. In this test, the quantity (weight) of particles remaining after elutriation of the fines (particles smaller than approximately 15 microns was measured after recirculation of the catalyst in a high speed air jet for five hours. An additional 17 hours of attrition air jet testing was measured in similar manner. The loss in weight percent per hour was measured for two preparations of fluidizable cracking catalyst in accordance with the present invention (designated as A and B) and compared with the attrition loss for a commercially marketed fluidizable cracking catalyst, as set forth in the following table:

| Sample | Percent fines per hour | |
|---|---|---|
| | Average hrs. 1–5 | Average hrs. 5–22 |
| Commercial control | 1.42 | 0.47 |
| A | 0.52 | 0.18 |
| B | 0.80 | 0.36 |

Such attrition test data suggest that the catalyst replacement rate for fluidizable catalyst such as Sample A might be approximately one-third that of some commercially marketed fluidizable catalyst long accepted by petroleum refineries. The attainment of such remarkable improvement in attrition resistance in a product as competitive as fluidizable cracking catalyst constitutes a significant forward step. The outstanding attrition resistance is attributable in part to the spheroidizing of the particles during the intense turbulence treatment. Such spheroidizing has additional advantages in manufacturing fluidizable catalyst, but the improved resistance to attrition is readily understood.

Example 2

Some series of tests are conducted to determine the ranges of variables appropriate for the critical steps of the procedure set forth in detail in Example 1. The quasi-plastic material scheduled for agglomeration should be pulverized in a grinding apparatus to a flour, all the particles of which can pass through a 100 mesh sieve. Vacuum extrusion of the quasi-plastic material permits more convenient feeding of the material to a factory-size hammer mill. If desired, the dough from the muller can be directly fed to the hammer mill. Large scale hammer mills and 50 ton per day capacity high-shear mixers have been utilized in factory evaluation of the present invention. The high shear conditions comprise an impeller rotating rapidly enough to assure peripheral speeds for the vanes within the range from 3 to 30 meters per second for a period from 1 to 60 minutes. The agglomeration of the plastic flour into fluidizable particles involves no change of temperature and no change of composition.

As with substantially any manufacturing procedure, modifications of one or more variables by plus or minus a small amount (e.g. 3% or even 5% ordinarily) affects the profitability of the operation without destroying the usefulness of the product.

The time for mulling the aqueous alkaline clay composition is usually within from 5 to about 50 minutes. In the two step recrystallization aging procedure, the first stage of aging is within the range from 10° C. to 40° C., conveniently designated as ambient temperature because weather changes provide substantially the same 10° C. to 40° C. temperature range at the factory. Such ambient temperature aging is conducted for from 8 to 40 hours, a range conveniently designated as about a day. Heat is generated by the interactions of the alkali, meta kaolin, and/or other ingredients, so that circulation of oil through a heat exchanger may be necessary to avoid excessive temperatures. The oil is circulated at a generally moderate rate sufficient to keep the particles dispersed in the liquid and prevent settling and compacting. After the first stage of recrystallization, during about one hour, the temperature is increased to about 95° C. by heating the oil circulating through the heat exchanger, and the second stage of recrystallization is conducted at the 80–120° C. temperature range for about 8 to 40 hours, conveniently designated as about a day.

The particles are then subjected to adequate ion-exchange treatment with a hot aqueous ammonium salt solution, whether the exchange is continuous or multistage, each theoretical ion-exchange is conducted at a convenient temperature in the 40–100° C. range for a convenient period such as 0.1–10 hours, for example at about 95° C. for about two hours. If the particles are to be calcined prior to introduction into the cracking vessel, then such heat treatment may comprise reactions which can be designated as drying, deammoniating, dehydrating and stabilizing all occurring simultaneously at various rates at various stages of the calcination). Such heat treatment may be conducted in a fluidized bed using any suitable gas stream such as air or steam or a mixture of steam and flue gas at a temperature increasing to a peak temperature within a range from about 550° C. to about 850° C. which peak temperature is maintained for a period of at least 1 but less than 10 hours, desirably about 4 hours. A rotary kiln is also suitable for such heat treatment. Much fluidizable cracking catalyst is first heat treated in the cracking vessel, and catalyst manufacturing costs are cut by this expedient.

A fluidized cracking catalyst prepared in accordance with Example 1 was pelleted and then evaluated by a standard test (Houdry Cat D–1 as described by Harriz in "Hydrocarbon Processing" vol. 45, No. 10, pp. 183–188 of 1966) for the cracking of a standard gas oil to obtain performance data showing superiority to performance data for a control (contemporarily marketed) fluidizable cracking catalyst as follows:

| | Control | Example 1 |
|---|---|---|
| Gasoline, volume percent | 43.5 | 53.1 |
| Coke, wt. percent | 6.0 | 2.7 |
| Gas gravity | 1.6 | 1.47 |
| Gas, wt. percent | 20.0 | 17.6 |
| Conversion, wt. percent | 65 | 67.0 |

Such data provide evidence that the fluidizable cracking catalyst of Example 1 has an attractive combination of properties.

In preferred embodiments of the present invention quasi-plastic solid compositions consisting predominantly of a combination of water and clay-type inorganic oxides are pulverized and dispersed in an inert organic liquid having a tendency to globulize water dispersed therein, and the aqueous clay quasi-plastic composition is spheroidized and agglomerated in a zone of intense turbulence adjacent the fringe of spiralling liquid. Particles having a size significantly greater than required in a fluidized bed can be produced by prolonging the treatment in the intense turbulence zone. Numerous variations in the composition of the aqueous clay-type material are appropriate inasmuch as the present invention is concerned primarily with restricting the distribution of sze of agglomerated spheroids of quasi-plastic materials, desirably so that at least four-fifths of the weight thereof have diameters suitable for use in a fluidized bed of cracking catalyst.

Example 3

By a series of tests it is established that the combination of grinding the clay to a flour consisting of particles smaller than about 150 microns and subjecting a liquid dispersion of such particles to intense turbulence zone is advantageous in the preparation of fluidizable particles consisting predominantly of the combination of clay-type inorganic oxides and water, which particles are precursors scheduled for end use as crystalline zeolitic cracking catalyst. Any fluidizable crystalline zeolitic cracking catalyst precursor particles are appropriate for the combination of grinding and spheroidizing in the intense turbulence zone.

The manufacture of a granular cracking catalyst often involves the steps of heating an ammonium aluminosilicate containing particle to volatilize the ammonia and to prepare an acidic aluminosilicate containing particle, which is stabilized by thermal treatment more severe than required for such deammoniation. Cracking catalyst for use in a fluidized bed is often shipped to the refinery as an ammonium aluminosilicate, so that calcination occurs in the cracking reactor.

A hammer mill having a throughput capacity of several tons per day was employed in pulverizing the precursor pellets of Example 1, using various speeds. The relationship between speed and percentage of product smaller than 44 microns is as follows:

| R.p.m.: | Percent smaller than 44 microns (through 325 mesh screen) |
|---|---|
| 3920 | 37.5 |
| 5050 | 77.8 |
| 7120 | 94.8 |

Hammer mill speeds greater than about 6000 r.p.m. are appropriate if 44 microns is the maximum size particle in the flour. By a series of tests, it is shown that spheroidized particles smaller than 150 microns (through 100 mesh) can be prepared by brief treatment in the intense turbulence zone of a flour ground to less than 150 microns.

The large size hammer mill satisfactorily pulverizes the composition delivered from the muller, so that the extrusion step is an optional operation having the advantage of simplifying the supply of material to the grinding apparatus.

The flour from the grinding apparatus is dispersed in an inert liquid such as a hydrocarbon oil. It is generally feasible to direct the oil dispersion to the intense agitation zone as a series of batch treatments to control the desired duration of swirling treatment.

As an example of the size distribution patterns on processing flour from the pellets of Example 1, one set of data showed the following:

| | Weight percent | | |
|---|---|---|---|
| | | Spheroidized particles after high-shear treatment | |
| Particle size | Flour before high-shear treatment | 6 minutes | 12 minutes |
| 150 microns and larger | 14.4 | 12.4 | 62.5 |
| 90–150 microns | 18.6 | 47.2 | 25.2 |
| 75–90 microns | 12.5 | 14.2 | 4.3 |
| 60–75 microns | 16.9 | 11.3 | 3.8 |
| 45–60 microns | 18.3 | 7.4 | 2.5 |
| 30–45 microns | 14.1 | 4.9 | 1.3 |
| 20–30 microns | 5.1 | 0.7 | 0.2 |
| 20 microns and smaller | 0.1 | 1.9 | 0.2 |

Such data show that the intense turbulence brought about an agglomeration of particles in this batch of precursor material. The agglomeration pattern was even more pronounced in the product from the twelve minute treatment than from the six minute treatment. Examination of the flour under the microscope showed the particles to be jagged and irregularly shaped whereas similar examination of the products from the intensive turbulent treatment showed the particles were substantially spheroidal and lacked the rough irregular shape of the original flour particles. Technical literature pertinent to high-shear mixers having horizontal impellers rotating fast enough to provide peripheral speeds of 3 to 30 meters per second for the vertical vanes recommend such mixers for grinding suspended particles by hydraulic attrition. The observed agglomeration of cracking catalyst precursor particles is just the opposite of the advertised pulverization action of the apparatus. Plasticity affects the results, so that more plastic compositions are adequately spheroidized more quickly, and so that less plastic compositions require more time for rounding of the jagged edges of the particles.

It should be noted that the agglomerating step involves no change in the quantitative elemental analysis of the material. Thus, the spheroidal particles have the identical composition (i.e. quantitative elemental analysis) as the flour. Another inherent feature of the agglomeration step is the absence of any heat transfer. Thus, the temperature of the oil is substantially the same as the temperature of the particles. The turbulence zone is a substantially uniform temperature zone.

Obviously many modifications and variations of the invention as hereinbefore set forth may be made without departing from the spirit and scope thereof, and therefore only such limitations should be imposed as are indicated in the appended claims.

I claim:

1. In the method of preparing fluidizable particles of precursors for crystalline zeolitic cracking catalyst, the steps of: preparing a precursor composition comprising water and clay-type inorganic oxides, said composition having significant cohesiveness, significant adhesiveness and significant plasticity; subjecting such precursor composition to the action of grinding apparatus to pulverize it into flour-type particles, substantially all of the flour-type particles being smaller than 150 microns; dispersing the pulverized particles in an inert organic liquid; creating a zone of intense turbulence within an inert organic liquid by rotating at about 4500 r.p.m. an impeller having vertical vanes above and below the plane of a horizontal disc, the peripheral speed of the vanes being from about 3 to about 30 meters per second; subjecting such dispersion of pulverized particles to treatment in a zone of intense turbulence at the fringe of liquid swirled by said impeller, said intense turbulence treatment agglomerating such pulverized particles into larger particles predominantly within the size range from about 15 to about 150 microns and said treatment spheroidizing the particles, whereby spheroidized particles of precursor for fluidizable cracking catalyst within the size range from about 15 to about 150 microns are produced in said dispersion.

2. In a method of making crystalline zeolitic cracking catalyst particles in which a composition comprising a minor amount of calcined kaolin, a major amount of clay, an alkaline agent, and water is mixed as an aqueous alkaline clay composition, said aqueous alkaline clay composition is subjected to aging in an inert organic liquid at ambient temperature for about a day and then to aging in said organic liquid for about a day at from 80 to 120° C., the organic liquid is removed from the particles, the particles are processed to prepare particles comprising ammonium aluminosilicate, said particles comprising ammonium aluminosilicate are heated to volatilize ammonia and to prepare acidic aluminosilicate particles having utility as crystalline zeolitic cracking catalyst particles, the improvement which consists of:
- extruding the composition of aqueous alkaline clay to prepare extruded pellets;
- pulverizing the extruded pellets to prepare alkaline aluminosilicate flour, substantially all of the particles of which are smaller than 150 microns;
- dispersing said alkaline aluminosilicate flour in an inert organic liquid;
- subjecting the dispersion of flour in inert organic liquid to treatment with vanes on a rotating impeller of a hydraulic attrition device, said vanes having a peripheral speed within the range from 3 to 30 meters per second, whereby such dispersion is subjected to a zone of intense turbulence, said treatment agglomerating such flour into larger particles, most of the weight of larger particles having a size within the range from 15 to 150 microns and said treatment spheroidizing the particles;
- and subjecting such 15 to 150 micron size spheroidized particles to aging and subsequent steps to prepare particles having utility as fluidizable cracking catalysts.

3. A method of preparing fluidizable spheroidal particles of crystalline zeolitic cracking catalyst consisting predominantly of the combination of clay-type inorganic oxides and water, said particles having a range of diameters of from about 15 to about 150 microns which method consists of: subjecting the combination of clay-type inorganic oxides and water to the action of a hammer mill to prepare a flour having particles smaller than 150 microns; preparing a dispersion of the flour in an inert organic liquid; subjecting said dispersion to a zone of intense turbulence adjacent to the vanes of a hydraulic attrition impeller rotating to provide a peripheral speed within the range from 3 to 30 meters per second whereby the particles are agglomerated into larger particles predominantly within the size range from about 15 to 150 microns and whereby the particles are spheroidized, said dispersion being subjected to said intense turbulence for a period from 1 to 60 minutes; and withdrawing said dispersion from said vanes to provide spheroidal particles of precursor for crystalline zeolitic cracking catalyst, said particles having a range of diameters of from about 15 to 150 microns.

4. In a method of preparing a fluidizable cracking catalyst consisting essentially of a kaolin-type matrix and a crystalline zeolitic component distributed throughout such matrix, the improvement which consists of:
- preparing a composition comprising kaolin-type aluminum disilicate and a significantly smaller amount of water;
- subjecting said composition to comminution to prepare a flour having particles smaller than 150 microns;
- preparing a dispersion of the flour in an inert organic liquid;
- subjecting said dispersion to a zone of intense turbulence adjacent to a hydraulic attrition impeller rotating to provide a peripheral speed within the range from 3 to 30 meters per second, whereby the particles are agglomerated into larger particles predominantly within the size range from about 15 to 150 microns, and whereby the particles are spheroidized, said dispersion being subjected to said intense turbulence for a period of from 1 to 60 minutes;
- withdrawing said dispersion from said impeller to provide spheroidal precursor particles having a range of diameters of from about 15 to 150 microns, the particle size distribution being suitable for fluidizable cracking;
- processing the withdrawn dispersion of precursor particles to form a dispersion of particles consisting of a kaolin-type matrix and a crystalline sodium zeolitic component distributed throughout such matrix;
- transforming said particles comprising sodium zeolitic component into cracking catalyst particles by steps comprising ion-exchanging the particles, and heating the ion-exchanged particles; and
- withdrawing as the product of the process cracking catalyst particles consisting essentially of a kaolin-type matrix and a crystalline zeolitic component distributed throughout such matrix, the particles size distribution being suitable for fluidized cracking.

5. In the method of preparing fluidizable particles of precusors for crystalline zeolitic cracking catalyst having a composition comprising water and clay-type inorganic oxides, said composition having significant cohesiveness, significant adhesiveness and significant plasticity, the improvement which consists of subjecting such precursor composition to the action of grinding apparatus to pulverize it into flour-type particles substantially all of the flour-type particles being smaller than 150 microns, dispersing the pulverized particles in an inert organic liquid, having a temperature substantially the same as the temperature of the pulverized particles, subjecting such dispersion of pulverized particles to treatment in a uniform temperature zone of intense turbulence at the fringe of swirling liquid, said intense turbulence treatment agglomerating such pulverized particles into larger particles of the identical quantitative elemental analysis as the pulverized particles, said larger particles being predominantly within the size range from about 15 to about 150 microns and said treatment spheroidizing the particles, whereby spheroidized particles of precursor for fluidizable cracking catalysts within the size range from about 15 to about 150 microns are produced in said dispersion.

6. In a method of making crystalline zeolitic cracking catalyst particles in which a composition comprising a minor amount of calcined kaolin, a major amount of clay, an alkaline agent, and water is mixed as an aqueous alkaline clay composition, said aqueous alkaline clay composition is subjected to aging in an inert organic liquid at ambient temperature for about a day and then to aging in said organic liquid for about a day as from 80 to 120° C., the organic liquid is removed from the particles, the particles are processed to prepare particles comprising ammonium aluminosilicate, said particles comprising ammonium aluminosilicate are heated to volatilize ammonia and to prepare acidic aluminosilicate particles having utility as crystalline zeolitic cracking catalyst particles, The improvement which consists of the steps of:
- extruding the composition of aqueous alkaline clay to prepare extruded pellets;
- pulverizing the extruded pellets to prepare alkaline aluminosilicate flour, substantially all of the particles of which are smaller than 150 microns;
- dispersing said alkaline aluminosilicate flour in an inert organic liquid;

subjecting the dispersion to treatment with vanes on a rotating impeller, said vanes having a peripheral speed within the range from 3 to 30 meters per second, whereby such dispersion is subjected to a uniform temperature zone of intense turbulence, said treatment agglomerating such flour into larger particles of the identical quantitative elemental analysis as the pulverized particles, said larger particles being predominantly within the size range from 15 to 150 microns and said treatment spheroidizing the particles;

and subjecting such 15 to 150 micron size spheroidized particles to aging and subsequent steps to prepare particles having utility as fluidizable cracking catalyst.

7. A method of preparing fluidizable spheroidal particles of crystalline zeolitic cracking catalyst consisting predominantly of the combination of clay-type inorganic oxides and water, said particles having a range of diameters of from about 15 to about 150 microns which method consists of: subjecting the combination of clay-type inorganic oxides and water to the action of a hammer mill to prepare a flour having particles smaller than 150 microns; preparing a dispersion of the flour in an inert organic liquid; subjecting said dispersion to a uniform temperature zone of intense turbulence adjacent to the vanes of an impeller rotating to provide a peripheral speed within the range from 3 to 30 meters per second whereby the particles are agglomerated into larger particles of the identical quantitative elemental analysis as the pulverized particles, said larger particles being predominantly within the size range from about 15 to 150 microns and whereby the particles are spheroidized, said dispersion being subjected to said intense turbulence for a period from 1 to 60 minutes; and withdrawing said dispersion from said vanes to provide spheroidal particles of precursor for crystalline zeolitic cracking catalyst, said particles having a range of diameters of from about 15 to about 150 microns.

References Cited

UNITED STATES PATENTS

| | | | |
|---|---|---|---|
| 2,944,986 | 7/1960 | Powell et al. | 252—448 X |
| 3,301,794 | 1/1967 | Cramer et al. | 252—455 X |
| 3,310,373 | 3/1967 | Johnson | 252—455 X |
| 3,323,876 | 6/1967 | Arey et al. | 252—455 X |
| 3,324,048 | 6/1967 | Plank et al. | 252—455 |
| 3,337,474 | 8/1967 | Cornelius et al. | 252—455 |

DANIEL E. WYMAN, Primary Examiner

C. F. DEES, Assistant Examiner

U.S. Cl. X.R.

23—112; 252—448